United States Patent [19]

Vanzo

[11] 4,077,804
[45] Mar. 7, 1978

[54] METHOD OF PRODUCING TONER PARTICLES BY IN-SITU POLYMERIZATION AND IMAGING PROCESS

[75] Inventor: Edward Vanzo, Webster, N.Y.

[73] Assignee: Xerox Corporation, Stamford, Conn.

[21] Appl. No.: 562,299

[22] Filed: Mar. 26, 1975

[51] Int. Cl.$^2$ .................... G03G 9/08; C08J 3/20
[52] U.S. Cl. .................... 96/1 SD; 96/1 LY; 252/62.1 P; 252/62.1 L; 260/42.14; 260/42.53; 427/19; 427/22; 427/24; 427/214; 427/221; 427/222; 428/407
[58] Field of Search ............ 427/15, 17, 14, 222, 427/19, 22, 24, 214, 221; 252/62.1 P, 62.1 L; 260/42.53, 42.14; 96/150, 1 LY; 428/407

[56] References Cited

U.S. PATENT DOCUMENTS

| | | | |
|---|---|---|---|
| 3,519,593 | 7/1970 | Bolger | 260/42.53 X |
| 3,544,500 | 12/1970 | Osmond et al. | 260/42.53 X |
| 3,634,251 | 1/1972 | Maeda et al. | 260/42.53 X |
| 3,639,243 | 2/1972 | Okuno et al. | 260/42.53 X |
| 3,657,130 | 4/1972 | Machida et al. | 260/42.53 X |
| 3,775,357 | 11/1973 | Nemeth | 260/42.53 X |
| 3,833,541 | 9/1974 | Shen | 260/42.53 |
| 3,959,153 | 5/1976 | Sadamatsu et al. | 252/62.1 P |
| 3,974,078 | 8/1976 | Crystal | 252/62.1 P |

*Primary Examiner*—Harry J. Gwinnell
*Assistant Examiner*—Stuart D. Frenkel

[57] ABSTRACT

Processes for producing colored toner particles are provided comprising mixing a monomer, a colorant and an initiator to form an oil soluble organic phase; dispersing this oil soluble phase in controlled size between 5 to 20 microns in a water phase, employing a suspending agent, for example polyvinyl alcohol; polymerizing, employing conventional suspension polymerization techniques; introducing a second monomer which is allowed to diffuse into the first polymer and consequently swells the polymer; introducing a water soluble initiator; and heating this reaction mixture to effect a polymerization of the second monomer and form the desired toner.

26 Claims, No Drawings

METHOD OF PRODUCING TONER PARTICLES BY IN-SITU POLYMERIZATION AND IMAGING PROCESS

BACKGROUND OF THE INVENTION

This invention relates in general to electrostatography and in particular to an electrostatographic developing material and a method for its production.

Electrostatography is perhaps best exemplified by the process of xerography as first described in U.S. Pat. No. 2,297,691 to C.F. Carlson. In this process, a photoconductor is first given a uniform electrostatic charge over its surface and is then exposed to an image of activating electromagnetic radiation which selectively dissipates the charge in illuminated areas of the photoconductor while charge in the non-illuminated areas is retained thereby forming an electrostatic latent image. This electrostatic latent image is then developed or made visible by the deposition of finely divided, electroscopic marking material, referred to in the art as "toner" to the surface of the photoconductor, which marking material conforms to the pattern of the electrostatic latent image. The visible image may then be utilized in a number of diverse ways. For example, the image may be viewed in-situ of the photoconductive insulator, fixed in place on the photoconductive insulator or transferred to a second surface such as a sheet of paper and fixed in place thereon as desired depending upon whether photoconductive insulating material is reusable as is the case with amorphous selenium photoconductive insulators or non-reusable as is the case with particulate zinc oxide-binder film type xerographic plates.

Although the original Carlson patent describes developing the electrostatic latent image by dusting it with various powders such as lycopodium, gum copal, cumarone-idene resin, various powdered dyes and the like, many other developing materials and techniques have been devised since that time. Some of the development techniques include brush development as described in U.S. Pat. No. 3,015,305 to Hall, powder cloud development as described in U.S. Pat. No. 2,918,900 to Carlson, liquid spray development as described in U.S. Pat. No. 2,551,582 to Carlson, immersion development as described in U.S. Pat. No. 3,010,842 to Ricker, loop development as described in U.S. Pat. No. 2,761,416 to Carlson and doner development as described in U.S. Pat. No. 2,895,847 to Mayo. However, it is more than likely that the commercial xerographic development technique most widely used today is the technique known as cascade development which is described in U.S. Pat. No. 2,618,552 to Wise. This development technique is carried out by rolling or cascading across the electrostatic latent image bearing surface, a developing mixture composed of relatively large carrier particles, each having a multiplicity of electrostatically adhering fine marking particles, known as toner particles, on its surface. As this mixture cascades or rolls across the image bearing surface, the toner particles are electrostatically deposited on the charged portions of the image and not on the uncharged background areas of the image. In addition, toner particles accidently falling on these non-imaged areas are physically removed therefrom by the electrostatic attraction of carrier particles which pass in close proximity to these unbound toner particles. The result of this development process is an excellent background-free copy of the electrostatic image made up of the toner particles electrostatically clinging to the image surface. As a general rule when any one of these development processes is used with a reusable electrostatographic plate, such as an amorphous selenium plate, the toner particle image is transferred to and fixed on a second layer such as a paper sheet in contact with the toner image by adhesive transfer, by electrostatic transfer as described in U.S. Pat. No. 2,576,047 to Schaffert. After the image is transferred from the surface of the amorphous selenium plate, the plate surface may be cleaned and it is then ready for reuse in a subsequent cycle. The toner resins are usually thermoplastics selected to have melting points significantly above any ambient temperatures which might be encountered (generally running above 180° F) and these are fixed to the paper in most cases by radiant heat fusing).

Most other electrostatographic techniques use the above described or similar development methods employing the same type of marking material or toner, and differ only in the mode of forming the electrostatic latent image charge pattern which is developed. (See, for example, U.S. Pat. No. 2,576,047 to Schaffert and U.S. Pat. No. 3,064,259 to Schwertz). In another technique, for example, in U.S. Pat. No. 3,081,698 to Childress, a conductive screen with a plurality of apertures which define the image area to be reproduced is spaced opposite a conductive backing electrode and a potential is applied between this backing electrode and the screen such that when finely divided electrostatographic toner particles smaller than the apertures in the screen are applied to the surface of the screen opposite the backing electrode, the electrostatic field set up by the potential source causes the particles to move through the apertures in the screen to form a toner image on the backing electrode in the configuration of the apertures on the screen. Various surfaces may be interposed between the screen and the backing electrode so that the particle image may be intercepted and formed on such interposed surfaces. Regardless of the surface upon which the toner image is deposited, it may be fixed in place upon that surface or transferred to another surface and fixed thereon.

The common feature of all of these electrostatographic systems is that they employ the lines of force from an electric field to control the deposition of finely divided, marking material or toner on a surface, thus forming an image with the toner particles.

In addition to the developing powder or toner materials described in the original Carlson patent, a number of other toner materials have been developed which are especially valuable for use in the newer development techniques including the cascade technique described immediately above. Generally speaking, these new toner materials have comprised various improved resins mixed with different pigments such as carbon black. Some exemplary patents along this line include U.S. Pat. No. 2,659,670 to Copley which describes a toner resin of rosin-modified phenol-formaldehyde, U.S. Pat. No. 25,136 to Carlson which describes a xerographic toner employing a resin of styrene polymers and copolymers and U.S. Pat. No. 3,079,342 to Insalaco describing a plasticized styrene-methacrylate copolymer resin.

In the past, these toners have generally been prepared by thoroughly mixing the softened resin and pigment to form a uniform dispersion as by blending these ingredients in a rubber mill or the like and then pulverizing this material to form it into small particles. Most frequently, this division of the resin-pigment dispersion has been made by jet pulverization of the material. Although this technique of toner manufacture has produced some very excellent toners, it does tend to have certain shortcomings. For example, it generally produces a rather wide range of particles sizes in the toner particles. Although the average particle size of toner made according to this technique generally ranges between about 5 and about 10 microns, individual particles ranging from sub micron in size to above 20 microns are not infrequently produced. Furthermore, this is a batch process which tends to be slow, expensive, noisy and dusty. In addition, this technique of toner production imposes certain limitations upon the material selected for the toner because the resin-pigment dispersion must be sufficiently friable so that it can be pulverized at an economically feasible rate of production. The problem which arises from this requirement is that when the resin-pigment dispersion is sufficiently friable for really high speed pulverizing, it tends to form an even wider range of particle sizes during pulverization including relatively large percentages of fines. In addition, such highly friable materials are frequently subject to further pulverization or powdering when they are employed for developing an electrostatographic copying apparatus. All other requirements of electrostatographic developers or toners including the requirements that they be stable in storage, non-agglomerative, have the proper triboelectric properties for developing, form good images, do not film or soil the selenium plate and have a low melting point for heat fusing are only compounded by the additional requirements imposed by this toner forming process.

Accordingly, it is an object of the present invention to provide a process which will directly produce a colored particle in a range of particle sizes from 1 to 100 microns useful in electrostatographic reproduction systems.

It is another object of the present invention to provide a direct process for colored toner production which avoids the many cumbersome operational sequences heretofore required.

It is still another object to provide a process for toner production which enables low-melting resins to be employed as the major constituent of the toner.

It is a still further object to provide a process for toner production wherein the surface hardness of a low-melting resinous particle can be modified to produce a useful toner material.

Yet still another object of this invention is to provide a novel encapsulation system for providing toners.

These and other objects of the instant invention are accomplished, generally speaking, by providing a process for producing colored toner particles comprising mixing a monomer, a colorant and an initiator to form an oil soluble organic phase; dispersing this oil soluble phase in controlled size between 5 to 20 microns in a water phase, employing a suspending agent, for example polyvinyl alcohol; polymerizing, employing conventional suspension polymerization techniques; introducing a second monomer which is allowed to diffuse into the first polymer and consequently swells the polymer; introducing a water soluble initiator; and heating this reaction mixture to effect a polymerization of the second monomer and form the desired toner. It is found that at the second initiator, the water soluble initiator, generates a free radical which attacks the surface of the swollen polymer particle and promotes polymerization at the surface by reacting with monomer at the surface thereby decreasing the monomer concentration and causing the transport of monomer to the surface by diffusion. The process is found to be self terminating when the total amount of sorbed monomer has been converted to polymer at the surface, thus providing an encapsulated toner employing the toner encapsulation system of the instant invention.

Thus, the surface hardness of the polymer particles can be increased by admixing the monomer of a tough polymer such as styrene with the polymer particles prior to recovering with continuous agitation. After a period of time sufficient to enable the monomer to diffuse into the polymer particles as above recited, the water soluble polymerization initiator is admixed and the polymer particles and the polymerization conditions and thereafter the surface hardened polymer particles containing a coloring are recovered.

Any organic momomer can be suitably employed in the present invention. The selection of a particular monomer is dictated by the properties desired in the ultimate polymeric toner. Thus, for example, monomers having the characteristic vinyl C=C structure can be employed. Illustrative of such monomers are esters of saturated alcohols with mono and polybasic unsaturated acids such as alkyl acrylates and methacrylates, haloacrylates, diethyl maleate, and mixtures thereof; vinyl and vinylidene halides such as vinyl chloride, vinyl fluoride, vinylidene chloride, vinylidene fluoride, tetrafluoroethylene, chlorotrifluoroethylene and mixtures thereof; vinyl esters such as vinyl acetate, unsaturated aromatic compounds such as styrene and various alkyl styrenes, alpha-methyl styrene parachlorostyrene, parabromostyrene, 2,4-dichlorostyrene, vinyl naphthalene, paramethoxystyrene and mixtures thereof; unsaturated amides such as acrylamide, methacrylamide and mixtures thereof; unsaturated nitriles such as acrylonitrile, methacrylonitrile, haloacrylonitrile, phenylacrylonitrile, vinylidene cyanide, and mixtures thereof; N-substituted unsaturated amides such as N,N dimethyl acrylamide, N-methyl acrylamide, and mixtures thereof; conjugated butadiones such as butadiene, isoprene and mixtures thereof; unsaturated ethers such as divinyl ether, diallyl ether, vinyl alkyl ether and mixtures thereof; unsaturated ketones such as divinyl ketone, vinyl alkyl detone and mixtures thereof; unsaturated aldehydes and acetals such as acrolein and its acetals, methacrolcin and its acetals, and mixtures thereof; unsaturated heterocyclic compounds such as vinyl pyridine, vinyl furan, vinyl coumarone, N-vinyl carbazole, and mixtures thereof; unsaturated alicyclic compounds such as vinyl-cyclopentane, vinyl-cyclohexane and mixtures thereof; unsaturated thio compounds such as vinyl thioethers; unsaturated hydrocarbons such as ethylene, propylene, coumarone, indene, terpene, polymerizable hydrocarbon fractions, isobutylene and mixtures thereof; alkyl compounds such as alkyl alcohol, allyl esters, diallyl phthalate, triallylcyanurate and mixtures thereof.

Any suitable mixture of copolymerizable monomers of the type described above can also be used in the process of this invention.

Any suitable colorant, whether insoluble pigment or soluble dye, can be dispersed or dissolved in the organic monomer or mixtures of monomers to form the organic phase employed in the dispersion polymerization process of this invention. If desired, especially for photoelectrophoretic processes, photosensitive colorants can also be employed. Additionally, combinations of pigments and/or dyes can be employed to obtain specific coloration effects.

Suitable pigments for use in the present invention include, for example, carbon blacks, Algol Yellow, Pigment Yellow 6, Benzidine Yellow, Vulcan Fast Yellow GR, Indofast Orange, Ortho Nitroaniline Orange, Vulcan Fast Orange GG, Irgazine Red, Paranitraniline Red, Toluidine Red, Permanent Carmine FB, Permanent Bordeaux FRR, Romanesta Red, Pigment Orange R, Vulcan Fast Rubine BF, Lake Red D, Lithol Red 2G, Double Ponceau R, Calamine Red MB, Pigment Scarlet 3B, Acid Alizarine Red B, Rhodamine 6G, Rhodamine B Lake, Methyl Violet B Lake, Gentian Violet Lake, Quinizarin, Victoria Pure Blue BO Lake, Ethylviolet Lake, Phthalocyanine Blue B Pr, Pigment Blue BCS, Peacock Blue Lake, Brilliant Green B, and the like.

Typical photosensitive organic materials include substituted and unsubstituted organic pigments such as phthalocyanines, for example, copper phthalocyanine, beta form of metal-free-phthalocyanine; tetrachlorophthalocyanine; and x-form of metal-free phthaocyanine; quinacridones, as, for example, 2,9-dimethyl quinacridone; 4,11-dimethyl quinacridone; 3,10 -dichloro-6,13-dihydroquinacridone; 2,9-dimethoxy-6,13-dihydro-quinacridone and 2,4,9,11-tetrachloroquinacridone; anthraquinones such as 1,5-bis-(beta-phenylethylamino)antraquinone; 1,5-bis-(3'-methoxypropylamino) anthraquinone; 1,2,5,6-di-(C,C'-diphenyl)-thiazole anthraquinone; 4-(2'-hydroxyphenylmethoxyamino)anthraquinone; triazines such as 2,4-diaminotriazine; 2,4-di-(1'-anthraquinonylamino-6-(1''-pyrenyl)-triazone; 2,4,6-tri-(1'-1'',1'''-pyrenyl)- triazone; azo compounds such as 2,4,6-tris (N-ethyl-p-aminophenylazo) phloroglucinol; 1,3,5,7-tetrahydroxy-2,4,6,8-tetra (N-methyl-N-hydroxyl-ethyl-p-aminophenylazo) naphthalene; 1,3,5-trihydroxy-2,4,6-tri(3'-nitro-N-methyl-N-hydroxy-methyl-4'-aminophenylazo) benzene; metal salts and lakes of azo dyes such as calcium lake of 6-bromo-1 (1'-sulfo-2-naphthaylazo)-2-naphthol; calcium lake of 1-(2'azonaphthalene-1'-sulfonic acid)-2-naphthol; calcium lake of 1 -(4'-ethyl-5'-chloroazobenzene-2'-sulfonic acid)-2-hydroxy-3 naphthoic acid; and mixtures thereof. Other organic pigments include polyvinylcarbazole; trisodium salt of 2-carboxyl phenyl azo (2-naphthiol-3,6-disulfonic acid; N-isopropyl-carbazole; 3-benzylidene amino-carbazole; 3-aminocarbazole; 1-(4'-methyl 5'chloro-2'-sulfonic acid) azobenzene-2-hydroxy-3-napthoic acid; N-2''pyridyl-8,13-dioxodinaphtho-(2,1-b; 2',3'-d)-furan-6carboxamide; 2-amino-5-chloro-p-toluene sulfonic acid and the like.

The x-form of metal free phthalocyanine is preferred because of its excellent photosensitivity and intense coloration.

Typical inorganic photosensitive compositions include cadmium sulfide, cadmium selenide, cadmium sulfo-selenide, zinc oxide, zinc sulfide, sulfur, selenium, antimony sulfide, lead oxide, lead sulfide, arsenic sulfide, arsenic-selenium, and mixtures thereof.

Any suitable dye or class of dyes may be used. Typical acid dyes include, for example, anthraquninone-C.I. Acid Blue 127, triphenylmethane-C.I. Acid Blue 103, azine-C.I. Acid Blue 98, xanthene-C.I. Acid Violet 9, nitroso-C.I. Acid Green 1, monoazo-C.I. Acid Yellow 29, diazo-C.I. Acid Green 20, xanthene-C.I. Acid Red 92, quinoline-C.I. Acid Yellow 3, diazo-C.I. Acid Orange 79.

Typical basic dyes include thiazole-C.I. Basic Yellow 1, ketone imine-C.I. Basic Yellow 2, acridine-C.I. Basic Yellow 4.

Typical dispersed dyes include nitro-acetamine Yellow 2 RZ-C.I. Disperse Yellow 1, azo-C.I. Disperse Orange 3, azo-Disperse Red 1, anthraquinone-C.I. Disperse Violet Celanthrene Red, anthraquinone-C.I. Disperse Blue 9, amino ketone-C.I. Disperse Green 1, azo-C.I. Disperse Black 9, C.I. Blacks 18, 19, 16, 1, 7, 12, 24, and 27; and diazo-C.I. Food Black 1.

The colorant can be dispersed in the monomer by admixing the colorant with the monomer under intensive agitation as obtained, for example, in a high speed, high shear mixer such as a Waring Blender equipped with a Polytron high shear head, a homogenizing mixer or the like, capable of a speed of from about 1000 to 3000 rpm. The amount of colorant added can range from about 2 to about 15 weight percent based on the weight of the monomer. Preferably, prior to dispersion of the colorant in the monomer, dispersing aids can be added to the monomer such as surfactants, dispersants and the like to assist in effecting a uniform dispersion. It has been found that increasing the viscosity of the monomer prior to addition of the colorant is an effective means of stabilizing the colorant dispersion. Typical oil soluble surfactants which can be employed to aid the dispersion of colorant are, for example, bis(trialkyl) esters of sodium sulfosuccinic acid, nonyl phenyl polyethoxy ethanol, dimethyl lauryl amine oxide, polyoxyethylene oleate, polyglycol stearate, polyethylene glycol oleic acid ester, and the like. Generally, from about 0.5 to about 1 weight percent surfactant based on the weight of monomer is sufficient. Stabilization of the colorant dispersion can be obtained by increasing the viscosity of the monomer-colorant dispersion through addition of a polymer soluble in the monomer. Generally, the most conveniently employed polymer is the polymer corresponding to the monomer employed; however, other polymers which are soluble in the monomer can also be suitable employed. Stabilization can be effected by addition of from about 1 to about 20 weight percent based on the weight of the monomer. A uniform dispersion of the colorant in the monomer can be effected by continuous high speed mixing for from about 10–20 minutes although longer or shorter periods can be employed depending upon the particular mixer employed.

Once the colorant/monomer dispersion is obtained, a polymerization initiator can be admixed therewith just prior to commencement of polymerization. Most conveniently, the polymerization initiator can be dissolved in a portion of monomer and the resulting solution can be blended with the colorant/monomer dispersion. Illustrative polymerization initiators which can be suitably employed are azobisisobutyronitrile (AIBN), benzoyl peroxide, methylethyl ketone peroxide, cumene hydroperoxide, 2,4-dichloryl benzoyl peroxide and the like. Generally, from about 0.5 to about 5 weight percent initiator based on the weight of monomer is sufficient.

In addition to the preparation of a readily polymerizable organic phase, the dispersion polymerization process of the present invention requires an aqueous phase containing a suspending agent. The aqueous phase can be prepared by dissolving a suspending agent in water with continuous agitation. Suitable water soluble suspending agents are, for example, water soluble polymers such as poly(vinyl alcohol), poly(ethylene oxide), methyl cellulose, hydroxyethyl cellulose, cyanoethyl cellulose and the like. Generally, from about 1 to about 10 weight percent suspending agent based on the weight of water has been found sufficient to effect a dispersion of the organic phase when said phase is admixed with the aqueous phase. Above about 10 weight percent, the resulting viscosity of the aqueous phase would generally be too high to enable the obtainment of the desired particle size. Preferably, 1 to about 4 weight percent suspending agent is employed.

After preparation of the aqueous phase, the aqueous phase can be charged to a reaction vessel and stirred at high speeds of from about 1000 to about 3000 rpm, while the organic phase is added thereto. Under these conditions, the organic phase is rapidly and uniformly dispersed within the aqueous phase as a plurality of particles having an average particle size ranging from 1 to about 100 microns. Generally, sufficient organic phase is added to the aqueous phase to effect a volumetric ratio of organic phase to aqueous phase ranging from about 0.05:1 to about 0.4:1, and preferably ranging from about 0.1:1 to about 0.2:1.

Upon completion of the addition and dispersion of the organic phase in the aqueous phase, the speed of agitation can be reduced to about 300 to 1000 rpm. The reaction vessel is then maintained at conditions sufficient to effect a rapid polymerization of the dispersion thereby avoiding the formation of a tacky particulate phase. Polymerization can be rapidly effected at a polymerization temperature of 60° to about 90° C under subatmospheric, atmospheric or super atmospheric pressure. Preferably, and most conveniently atmospheric pressure or autogenously generated pressures can be employed. Under these polymerization conditions, the reaction will be complete within from about 1 to 4 hours. Higher or lower temperatures can be employed depending upon the particular polymerization initiator employed.

When using carbon black as the colorant, initiation of polymerization sometimes becomes complicated because of the ability of the carbon black to trap the free radicals generated. AIBN, however, has been found to be an effective initiator even with carbon black.

Upon completion of the polymerization, the polymerized particles can be recovered by cooling the reaction vessel to room temperature while stirring continuously to prevent agglomeration. Thereafter, the reaction medium can be thoroughly washed with water to remove the suspending agent and the particles can be recovered by filtration and drying. If desired, after washing, the aqueous dispersion can be freeze dried to recover the particles.

It is considered preferable in order to obtain free flowing particles, that blocking or agglomeration of the particles due to moisture sensitivity be avoided. Moisture sensitivity is sometimes imparted to the particles during polymerization by grafting thereon of the suspending agent as, for example, poly(vinyl alcohol) can be grafted to the particulate polymer during the polymerization reaction. The particles can be made moisture insensitive by treating with an insolubilizer such as melamine formaldehyde resins, toluene diisocyanate, dimethylolurea and the like. This can be conveniently accomplished by dipping the particles in a bath of the hardening agent or through use of a spray of said hardening agent.

In instances wherein the monomer selected for use in preparation of the ultimate toner resin provides a low melting polymer, it may be desirable to provide a means for surface hardening of the particle to enhance its use as a toner particle under the relatively rigorous conditions encountered in conventional electrostatographic and photoelectrophoretic processes.

Surface hardening of the toner particles can be affected after the initial polymerization reaction by first removing any residual initial initiator present in the reaction system. This can be easily accomplished by heating the reaction system at temperatures ranging from about 60° to 90° C for a sufficient period of time to remove the initiator. The actual period of time will vary depending upon the half life of the particular initiator employed in the presence of the colorant, particularly carbon black. Generally, heating within said temperature range for about 4 hours has been found sufficient. Thereafter, 5 to about 10 weight percent based on the weight of particulate polymer of a monomer of a tough polymer such as styrene, methyl methacrylate, vinyl chloride, vinyl pyridine and the like is added to the reaction system with continuous stirring for a sufficient period of time to allow the monomer to diffuse into the polymer particles. Upon completion of the diffusion period, generally from about 0.5 to about 2 hours, from about 0.1 to about 10 weight percent of water soluble initiator based on the weight of monomer is added to the aqueous reaction system and polymerization is effected by heating the reaction system at temperatures ranging from about 60° to 80° C for about one hour with continuous agitation. Suitable water soluble initiators are, for example, potassium persulfate, ammonium persulfate, hydrogen peroxide, sodium perborate and the like. In this manner, polymerization is effected only at the surface of the toner particles thereby imparting surface hardening thereto.

Upon completion of the polymerization, the surface hardened toner particles can be recovered as described above; namely by washing the particles with water to obtain a clear aqueous slurry of the toner particles which can be filtered and dried or freezedried to recover the particles intact.

In this manner, uniform spherical toner particles containing a colorant which can be photosensitive can be readily obtained. Advantageously, the particles can be surface hardened in situ enabling the use of low melting resins which are desirable for rapid fusing operations.

The toner compositions obtained in accordance with the present invention can be admixed with solid or non-solvent liquid vehicles therefor to form electrostatographic developer compositions. In general, successful results have been obtained with from about 10 to about 200 parts by weight of either solid or liquid vehicle to about 1 part by weight of toner. Preferably, the vehicle to toner ratio ranges from about 50 to 1 to about 150 to 1. In such preferred compositions the vehicle acts effectively to remove any toner particles which might tend to adhere to a non-image area and the toner itself forms dense readily transferable and fusible images.

Solid vehicles are generally in the form of granular carrier particles which are grossly larger than the toner particles by at least an order of magnitude of size and are shaped to roll across the image-bearing surface.

Generally speaking, the carrier particles should be of sufficient size so that their gravitation or momentum force is greater than the force of attraction of the toner in the charged areas where the toner is retained on the plate in order that the granular carrier particles will not be retained by the toner particles, while, at the same time, the toner particles are attracted and held, or repelled, as the case may be, by the charged or uncharged areas of the plate since said toner particles acquire a charge of opposite polarity to the charge of both the granular carrier particles and the plate. It has been found best to use granular carrier particles of a size larger than about 10 microns, usually between 30 and about 1,000 microns, and toner particles of a size from about 1 to 20 microns. The granular carrier particles may, if desired, be somewhat larger or smaller as long as the proper size relationship to the electroscopic toner is maintained so that the granular carrier particles will flow easily over the image surface by gravity when the plate is inclined without requiring additional means or measures to remove them.

Typical carrier materials include: sodium chloride, ammonium chloride, potassium chlorate, granular zircon, granular silicon, methyl methacrylate, glass, silicon dioxide, flintshot, iron, steel, ferrite, nickel, carborundum, and mixtures thereof. Many of the foregoing and other typical carriers and described by L. E. Walkup et al, in U.S. Pat. No. 2,638,416 and E. M. Wise in U.S. Pat. No. 2,618,552.

When it is desired to employ a liquid developer composition, the toner compositions of the present invention can be incorporated in any conventional liquid vehicle which is a non-solvent for and non-reactive with the polymer and which has a volume resistivity above about $10^{10}$ ohm-cm and a dielectric constant greater than 2.5. In addition, the liquid vehicle should, if possible, be one which does not have an appreciable toxicity and which is not too flammable. It is also considered desirable to employ a liquid which is neither malodorous nor highly colored. It is preferred that the liquid vehicle be inert to the material which bears the electrostatic latent image to be developed. Suitable liquid carriers are, for example, kerosene, turpentine, benzene, cyclohexane, carbon tetrachloride, silicones, fluorinated hydrocarbons such as tetrachlorodifluoroethane, trichlorotrifluoroethane and the like. Other suitable liquid vehicles are described in U.S. Pat. No. 2,899,335.

In another aspect of the present invention, an electrostatographic process is provided which employs the developer compositions of this invention. The toner develops the electrostatic latent image on the image bearing surface and can be fused thereon or can be subsequently electrostatically transferred to a substrate and then fused on the substrate to form a permanent image thereon.

The following examples further define, describe and compare methods of preparing the toner compositions of the present invention and of utilizing them in developer compositions to develop electrostatic latent images. Parts and percentages are by weight unless otherwise indicated.

EXAMPLES I–III

In the following examples, carbon black dispersions in the monomer were effected by adding the carbon black to the monomer in an explosion proof Waring Blender equipped with a Polytron, high shear head.

Polymerizations were conducted in a standard two liter reaction kettle or round bottom flask equipped with a Teflon paddle blade stirrer, argon purge line and sampling tube. Heating was accomplished by either a heating mantle or immersion in a water bath.

Carbon black was dried under vacuum for one hour at 100° C. Surfactant additives and polymers, generally poly(vinyl acetate), to stabilize the carbon black dispersion were dissolved in the monomer before the carbon black was added. A Waring Blender equipped with a Polytron head was used to disperse the carbon black and the dispersion was allowed to stand for two hours before polymerization. The initiator was dissolved in a second portion of monomer and blended with the carbon black/monomer dispersion just prior to polymerization.

The aqueous phase was prepared by dissolving the required amount of suspending agent, generally poly(vinyl alcohol), into water in a beaker equipped with a magnetic stirrer. The aqueous phase was placed in the reaction vessel and stirred at high speed while the organic phase was introduced. High speed agitation was continued for a sufficient time to disperse the organic phase after which the stirring speed was reduced to approximately 300 rpm.

The reaction vessel was then placed in a water bath heated to the desired polymerization temperature. Samples were taken periodically by means of a sampling tube utilizing argon pressure. On completing the polymerization, the dispersion was cooled to room temperature while stirring continuously to prevent agglomeration.

To perform the encapsulation by in situ polymerization, subsequent to the initial polymerization, a quantity of styrene was added while continuously stirring. A period of time, generally 30 minutes, was allowed for the styrene to diffuse into the particles after which a quantity of water soluble initiator (potassium persulfate) was added to the reaction flask. Heating continued for an hour after which the dispersion was recovered.

Upon removal from the reaction flask, samples were recovered by diluting the dispersion with water and either centrifuging or allowing the particles to settle out. The supernatant liquid was decanted and more water added, followed by agitation. This procedure was repeated until a clear supernatant liquid was obtained. Then a concentrated slurry of the particles in water was freeze-dried to recover the particles intact.

Table I summarizes the results obtained.

TABLE I

| | Dispersion Polymerization of Colored Toner Particles | | |
|---|---|---|---|
| Example | 1 | 2 | 3 |
| Organic Phase | | | |
| Monomer | VAC | VAC | VAC |
| Grams | 126.5 | 123.7 | 104.0 |
| Carbon Black (wt. %) (1) | 8.9 | 9.1 | 9.1 |
| Surfactant/(Triton N-101) (4) wt. % | 0.44 | 0.44 | 0.22 |
| Polymer | PVAC | PVAC | PVAC |
| weight % (1) | 26.5 | 27.2 | 36.4 |
| Initiator (AIBN) (wt. %) (2) | 4.0 | 3.0 | 5.65 |
| Aqueous Phase | | | |
| H₂O grams. | 900 | 900 | 900 |
| Suspending Agent (PVA) (wt. %) (3) | 3.0 | 3.0 | 3.0 |
| Dispersion Polymerization | | | |
| Volumetric phase ratio organic/aqueous | 0.22 | 0.21 | 0.21 |
| Initial dispersion rate (rpm) | 1000 | 1000 | 1000 |
| Polymerization dispersion rate (rpm) | 300 | 300 | 300 |
| Time-hrs. | 0.17 | 0.17 | 0.17 |
| Temp. (° C.) | 65° | 65° | 65° |
| Conversion % | — | 97.4 | 95.2 |
| Encapsulation monomer | 10 | 10 | 10 |

TABLE I-continued

| | Dispersion Polymerization of Colored Toner Particles | | |
|---|---|---|---|
| Example | 1 | 2 | 3 |
| (styrene) Vol. % | | | |
| Initiator | K₂S₂O₈ | (NH₄)₂S₂O₈ | K₂S₂O₈ |
| Weight % encapsulation monomer | 10.0 | 1.0 | 5.0 |
| Toner | | | |
| Particle Size (μ) | 5-50 | 5-25 | 5-30 |
| Color | Black | Black | Black |
| Blocking Temperature (° F) | 150 | 125-130 | 120 |
| Triboelectric Value (μc/gm) | 0.93 | 0.27 | 2.39 |

VAC = vinyl acetate
VP = vinyl proprionate
BMA = n-butyl methacrylate
PVAC = poly(vinyl acetate)
PMBA = poly(n-butyl methacrylate)
PVA = poly(vinyl alcohol)
[1] based on total organic phase
[2] based on monomer
[3] based on total aqueous phase
[a] Triton N-101, a nonyl phenyl polyethoxy ethanol non-ionic surfactant available from Rohm & Haas Co.

It can be seen from Table I that the toners which were surface hardened with styrene exhibited higher blocking temperatures than those which were not so treated. The toners which exhibited blocking temperatures less than 115° F, generally blocked at temperatures appreciably below 115° F which was the lower reportable limit of the blocking test.

Although specific materials and conditions were set forth in the above exemplary processes in making and using the toner particles of this invention, these are merely intended as illustrations of the present invention. Various other monomers, polymers, surfactants, initiators, suspending agents, colorants and reaction conditions such as those listed above may be substituted in the examples with similar results.

Other modifications of the present invention will occur to those skilled in the art upon a reading of the present disclosure. These are intended to be included within the scope of this invention.

What is claimed is:

1. A process for producing colored toner particles comprising admixing a colorant with a first organic monomer to form an organic phase; maintaining said organic phase under continuous agitation; admixing a polymerization initiator with said organic phase; admixing said organic phase with an aqueous phase containing a suspending agent therein under polymerization conditions to form a suspension; polymerizing said suspension to provide polymer particles containing said colorant and having a particle size in the range of 1 to about 100 microns; admixing a second monomer of a tough polymer with the polymer particles under continuous agitation for a period of time sufficient to enable the monomer to diffuse into the polymer particles; admixing a water soluble polymerization initiator with the polymer particles under polymerization conditions in said aqueous phase; polymerizing said second monomer; and thereafter recovering the polymer particles.

2. A process as defined in claim 1 wherein said second monomer is a vinyl monomer.

3. A process as defined in claim 1 wherein the colorant is an insoluble pigment.

4. A process as defined in claim 1 wherein the colorant is a soluble dye.

5. A process as defined in claim 1 wherein the colorant is photosensitive.

6. A process as defined in claim 1 wherein the amount of colorant employed ranges from about 2 to about 15 weight percent based on the weight of said first monomer.

7. A process as defined in claim 1 wherein from about 0.5 to about 1 weight percent of a surfactant based on the weight of said first monomer is admixed with the organic phase.

8. A process as defined in claim 1 wherein the dispersion of colorant in the organic phase is stabilized by the addition of from about 1 to about 20 weight percent based on the weight of the monomer of a polymer soluble in said first monomer.

9. A process as defined in claim 1 wherein from about 0.5 to about 5 weight percent polymerization initiator based on the weight of said first monomer is admixed with the organic phase.

10. A process as defined in claim 1 wherein the suspending agent is a water soluble polymer.

11. A process as defined in claim 10 wherein from about 1 to about 10 weight suspending agent based on the weight of water is employed.

12. A process as defined in claim 1 wherein the organic phase is admixed with the aqueous phase at speeds of from about 1000 to about 3000 rpm.

13. A process as defined in claim 1 wherein the volumetric ratio of organic phase to aqueous phase ranges from about 0.05:1 to about 0.4:1.

14. A process as defined in claim 1 wherein the first polymerization is effected at temperatures ranging from 60° to about 90° C with continuous agitation at speeds ranging from about 300 to 1000 rpm.

15. A process as defined in claim 1 wherein the colorant is carbon black and the first polymerization initiator is azobisisobutyronitrile.

16. A process as defined in claim 1 wherein the polymer particles after the polymerization of said second monomer are rendered moisture insensitive by treatment with an insolublizing agent.

17. A process as defined in claim 1 wherein after completion of the first polymerization, the reaction system is heated at a temperature ranging from about 60° to about 90° C for a sufficient period of time to remove any residual polymerization initiator; admixing from about 5 to about 10 weight percent, based on the weight of polymer particles, of styrene with said polymer particles with continuous stirring for a sufficient period of time to enable the styrene to diffuse into the polymer particles.

18. A process as defined in claim 17 wherein the diffusion period ranges from about 0.5 to about 2 hours.

19. A process as defined in claim 17 wherein, upon completion of the diffusion period, from about 0.1 to about 10 weight percent based on the weight of the monomer of a water soluble initiator is admixed with the polymer particles and polymerization is effected by heating said polymer particles at tempertures ranging from about 60° to about 80° C with continuous agitation.

20. A process as defined in claim 19 wherein the water soluble initiator is potassium persulfate.

21. A process as defined in claim 19 wherein the water soluble initiator is ammonium persulfate.

22. The process of claim 1 wherein the polymer particles are rendered moisture insensitive after the polymerization of said second monomer by treatment with a material selected from the group of melamine formaldehyde resins, toluene diisocyanate and dimethylolurea.

23. An electrostatographic developer composition comprising a mixture of finely-divider toner particles and a solid or liquid vehicle therefor, said toner particles being prepared by admixing a colorant with at least one organic monomer to form an organic phase; maintaining said organic phase under continuous agitation; admixing a polymerization initiator with said organic phase; admixing said organic phase with an aqueous phase containing a suspending agent therein under polymerization conditions to form a suspension; polymerizing said suspension to provide polymer particles containing said colorant and having a particle size in the range of 1 to about 100 microns; admixing a second monomer of a tough polymer with the polymer particles under continuous agitation for a period of time sufficient to enable the monomer to diffuse into the polymer particles; admixing a water soluble polymerization initiator with the polymer particles under polymerization conditions in said aqueous phase; polymerizing said second monomer; and thereafter, recovering said polymer particles.

24. Electrostatographic developer composition as defined in claim 23 comprising from about 10 to 200 parts by weight of solid or liquid vehicle per part by weight of toner particles.

25. An electrostatic imaging process comprising the steps of forming an electrostatic latent image on an imaging surface and developing said electrostatic latent image with the developer composition of claim 23 whereby at least a portion of said finelydivided toner particles is attracted to and held on said surface in conformance with said electrostatic latent image to form a developed latent electrostatic image.

26. An electrostatic latent image process as defined in claim 25 wherein the developed electrostatic latent image is electrostatically transferred to a second surface and said transferred image is fused onto said second surface.

* * * * *